(12) United States Patent
Beck (10) Patent No.: US 7,504,583 B2
(45) Date of Patent: Mar. 17, 2009

(54) COUPLER FOR CABLE TROUGH

(75) Inventor: Ronald A. Beck, St. Paul, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/677,188

(22) Filed: Feb. 21, 2007

(65) Prior Publication Data

US 2008/0197242 A1 Aug. 21, 2008

(51) Int. Cl.
*H02G 3/04* (2006.01)

(52) U.S. Cl. .................. 174/68.1; 174/95; 174/135; 174/97; 174/72 C; 439/79; 403/263

(58) Field of Classification Search ............ 174/68.1, 174/68.3, 72 C, 97, 72 A, 95, 99 R, 100, 174/135; 439/79; 385/134–136; 403/263, 403/293, 387, 325, 292; 248/68.1, 49; 52/220.5
See application file for complete search history.

(56) References Cited

U.S. PATENT DOCUMENTS

| | | | |
|---|---|---|---|
| 2,316,166 A | 4/1943 | Huguelet |
| 2,360,159 A | 10/1944 | Peck |
| 2,741,499 A | 4/1956 | Kussmaul |
| 2,821,154 A | 1/1958 | Tennison, Jr. |
| 2,823,056 A | 2/1958 | DiMeo et al. |
| 2,834,622 A | 5/1958 | Reeves |
| 2,880,887 A | 4/1959 | McClurg |
| 2,891,750 A | 6/1959 | Bergquist |
| 3,022,972 A | 2/1962 | Bunston |
| 3,042,351 A | 7/1962 | Du Bois |
| 3,188,030 A | 6/1965 | Fischer |
| 3,351,699 A | 11/1967 | Merckle |
| 3,370,121 A | 2/1968 | Merckle |
| 3,457,598 A | 7/1969 | Mariani |
| 3,471,629 A | 10/1969 | O'Leary |
| 3,493,917 A | 2/1970 | Glowacz |
| 3,603,625 A | 9/1971 | Cotrrell et al. |
| 3,782,420 A | 1/1974 | Kolb et al. |
| 3,875,618 A | 4/1975 | Schuplin |
| 3,915,420 A | 10/1975 | Norris |
| 4,099,749 A | 7/1978 | van Vliet |

(Continued)

FOREIGN PATENT DOCUMENTS

DE  3636412 A1  4/1988

(Continued)

OTHER PUBLICATIONS

Ditel, Inc.; Ditel UPL-1000/UPT-1000/Corner Cable Guides; product information, 2 pages, © 1986.

(Continued)

*Primary Examiner*—Dhiru R Patel
(74) *Attorney, Agent, or Firm*—Merchant & Gould P.C.

(57) ABSTRACT

Elements, couplers, systems, and methods for joining two or more trough members. A locking element for a coupler of a cable trough system can include a threaded portion including first and second ends, the first end extending at an angle to a point, and a head portion coupled to the threaded portion at the second end, the head portion including a key portion that corresponds to the point of the first end of the threaded portion.

12 Claims, 11 Drawing Sheets

U.S. PATENT DOCUMENTS

| | | | |
|---|---|---|---|
| 4,305,236 | A | 12/1981 | Williams |
| 4,854,665 | A | 8/1989 | Gagnon |
| 4,954,015 | A | 9/1990 | McGowan |
| 5,035,092 | A | 7/1991 | Brant |
| 5,038,528 | A | 8/1991 | Brant |
| 5,067,678 | A | 11/1991 | Henneberger et al. |
| 5,078,530 | A | 1/1992 | Kim |
| 5,100,221 | A | 3/1992 | Carney et al. |
| 5,134,250 | A | 7/1992 | Caveney et al. |
| 5,142,606 | A | 8/1992 | Carney et al. |
| 5,161,580 | A | 11/1992 | Klug |
| 5,316,243 | A | 5/1994 | Henneberger |
| D348,651 | S | 7/1994 | Henneberger |
| 5,469,893 | A | 11/1995 | Caveney et al. |
| 5,547,307 | A | 8/1996 | Decore et al. |
| 5,617,678 | A | 4/1997 | Morandin et al. |
| 5,720,567 | A | 2/1998 | Rinderer |
| 5,752,781 | A | 5/1998 | Haataja et al. |
| 5,753,855 | A | 5/1998 | Nicoli et al. |
| 5,792,993 | A | 8/1998 | Rinderer |
| D402,262 | S | 12/1998 | Scherer et al. |
| D402,263 | S | 12/1998 | Scherer et al. |
| D413,306 | S | 8/1999 | Scherer et al. |
| 5,995,699 | A | 11/1999 | Vargas et al. |
| 5,998,732 | A | 12/1999 | Caveney et al. |
| D419,962 | S | 2/2000 | Caveney |
| 6,037,543 | A | 3/2000 | Nicoli et al. |
| D430,543 | S | 9/2000 | Rohder |
| 6,126,122 | A | 10/2000 | Ismert |
| 6,143,984 | A | 11/2000 | Auteri |
| 6,188,024 | B1 | 2/2001 | Benito-Navazo |
| 6,193,434 | B1 | 2/2001 | Durin et al. |
| D447,737 | S | 9/2001 | Scherer et al. |
| 6,402,418 | B1 | 6/2002 | Durin et al. |
| 6,424,779 | B1 | 7/2002 | Ellison et al. |
| 6,450,458 | B1 | 9/2002 | Bernard |
| 6,454,485 | B2 | 9/2002 | Holcomb et al. |
| 6,463,631 | B2 | 10/2002 | Noda |
| 6,476,327 | B1 | 11/2002 | Bernard et al. |
| 6,512,875 | B1 | 1/2003 | Johnson et al. |
| 6,520,192 | B1 | 2/2003 | Lo |
| 6,523,791 | B2 | 2/2003 | Bernard et al. |
| 6,603,073 | B2 | 8/2003 | Ferris |
| 6,634,605 | B2 | 10/2003 | Bernard et al. |
| 6,634,825 | B2 | 10/2003 | Tolkoff et al. |
| 6,709,186 | B2 | 3/2004 | Ferris et al. |
| 6,715,719 | B2 | 4/2004 | Nault et al. |
| 6,810,191 | B2 | 10/2004 | Ferris et al. |
| 7,029,195 | B2 | 4/2006 | Nault et al. |
| 7,093,997 | B2 | 8/2006 | Ferris et al. |
| 7,175,137 | B2 | 2/2007 | Ferris et al. |
| 7,246,778 | B2 | 7/2007 | Caveney et al. |
| 2002/0006312 | A1 | 1/2002 | Buard |
| 2002/0096606 | A1 | 7/2002 | Bernard et al. |
| 2003/0147690 | A1 | 8/2003 | Ronnquist |
| 2003/0177628 | A1 | 9/2003 | Viklund |
| 2003/0183731 | A1 | 10/2003 | Ferris et al. |
| 2003/0183732 | A1 | 10/2003 | Nault et al. |
| 2004/0159750 | A1 | 8/2004 | Ferris et al. |
| 2006/0210356 | A1 | 9/2006 | Ferris et al. |
| 2006/0261240 | A1 | 11/2006 | Ferris et al. |

FOREIGN PATENT DOCUMENTS

| | | |
|---|---|---|
| DE | 102 12 285 A1 | 11/2002 |
| EP | 0 315 023 A2 | 5/1989 |
| EP | 0 571 307 A1 | 11/1993 |
| EP | 0 486 442 B1 | 10/1995 |
| EP | 0 874 260 A1 | 10/1998 |
| EP | 1 033 800 A1 | 9/2000 |
| EP | 1 160 949 A2 | 12/2001 |
| EP | 1 160 950 A2 | 12/2001 |
| EP | 1 249 912 A1 | 10/2002 |
| FR | 1479341 | 5/1967 |
| GB | 549840 | 12/1942 |
| GB | 1 342 085 | 12/1973 |
| WO | 99/06746 | 2/1999 |
| WO | 00/75550 | 12/2000 |
| WO | 02/18991 | 3/2002 |
| WO | 02/31939 | 4/2002 |
| WO | 02/33445 | 4/2002 |
| WO | 02/086576 A1 | 10/2002 |
| WO | 2004/006400 A1 | 1/2004 |

OTHER PUBLICATIONS

ADC Telecommunications, Inc.; FiberGuide™, Fiber Management System, 6 pages front and back printed, 16/1989.

Warren & Brown Technologies Pty. Ltd., Fibre Optic Management Systems, Component Selection Guide, 19 pages of product information. Source: www.warrenandbrown.com.au (admitted prior art as of the filing date).

Panduit Network Connectivity Group, FiberRunner™ 6×4 Routing System Product Brochure, 2 pages, © Panduit Corp. 2000.

Panduit Corp. FiberRunner™ 4×4 Quiklock™ Coupler (FRBC4×4) Customer Drawing, 1 page, Jul. 13, 2001.

Panduit Corp. FiberRunner™ 6×4 Quiklock™ Coupler (FRBC6×4) Customer Drawing, 1 page, May 10, 2000.

Panduit Corp. FiberRunner™ 12×4 Quiklock™ Coupler (FRBC12×4) Customer Drawing, 1 page, Jan. 3, 2001.

Photographs of various Panduit products (admitted prior art as of the filing date).

U.S. Appl. No. 11/425,625, filed on Jun. 21, 2006.
U.S. Appl. No. 11/677,174, filed on Feb. 21, 2007.
U.S. Appl. No. 11/677,181, filed on Feb. 21, 2007.
U.S. Appl. No. 11/677,184, filed on Feb. 21, 2007.
U.S. Appl. No. 11/677,193, filed on Feb. 21, 2007.
U.S. Appl. No. 11/677,200, filed on Feb. 21, 2007.
U.S. Appl. No. 11/677,203, filed on Feb. 21, 2007.

COUPLER FOR CABLE TROUGH

RELATED APPLICATIONS

This application is related to the following applications: U.S. patent application Ser. No. 11/677,181; U.S. patent application Ser. No. 11/677,184; U.S. patent application Ser. No. 11/677,193; U.S. patent application Ser. No. 11/677,200; U.S. patent application Ser. No. 11/677,203; and U.S. patent application Ser. No. 11/677,174; all of which were filed on even date herewith and are incorporated by reference herein.

TECHNICAL FIELD

Embodiments disclosed herein relate to systems for the management and routing of telecommunication cables, and, more particularly, to couplers for joining trough members.

BACKGROUND

In the telecommunications industry, optical fiber systems are increasingly used for high-speed signal transmission. With the increased utilization of optical fiber systems, optical fiber cable management requires industry attention.

One area of optical fiber management is the routing of optical fibers from one piece of equipment to another. For example, in a telecommunications facility, optical fiber cables are routed between fiber distribution equipment and optical line terminating equipment. In buildings and other structures that carry such equipment, the cable routing typically takes place in concealed ceiling areas or in other manners to route cables from one location to another.

When routing optical fibers and other cables such as copper wires, it is desirable that a routing system is readily modifiable and adaptable to changes in equipment needs. Accordingly, such routing systems include a plurality of components, such as trough members and couplers, for defining the cable routing paths. The trough members are joined together by couplings. U.S. Pat. Nos. 5,067,678; 5,316,243; 5,752,781; 6,709,186; and 6,715,719 teach cable routing systems that include a plurality of trough members and couplers.

Various concerns arise with the use of couplers for coupling trough members. One concern is that a plurality of hardware is used for joining the trough members. This hardware can be cumbersome. Further, there is sometimes a need to rearrange or change the trough members and couplers. It is desirable to provide couplers that can be disconnected and reconnected.

SUMMARY

Embodiments disclosed herein relate to a system for the management and routing of telecommunication cables, and, more particularly, to elements, couplers, systems, and methods for joining two or more trough members.

One aspect relates to a locking element for a coupler of a cable trough system, the locking element including a threaded portion including first and second ends, the first end extending at an angle to a point, and a head portion coupled to the threaded portion at the second end, the head portion including a key portion that corresponds to the point of the first end of the threaded portion.

DETAILED DESCRIPTION

As used herein, the terms "couple" and "coupled" mean to join or attach a first element in relation to a second element, whether the attachment is made directly with the second element or indirectly through one or more intermediate components. As used herein, the term "slot" means a space defined by one or more surfaces and can include, without limitation, T-slots, closed slots, flanges, and projections.

Figure 1:
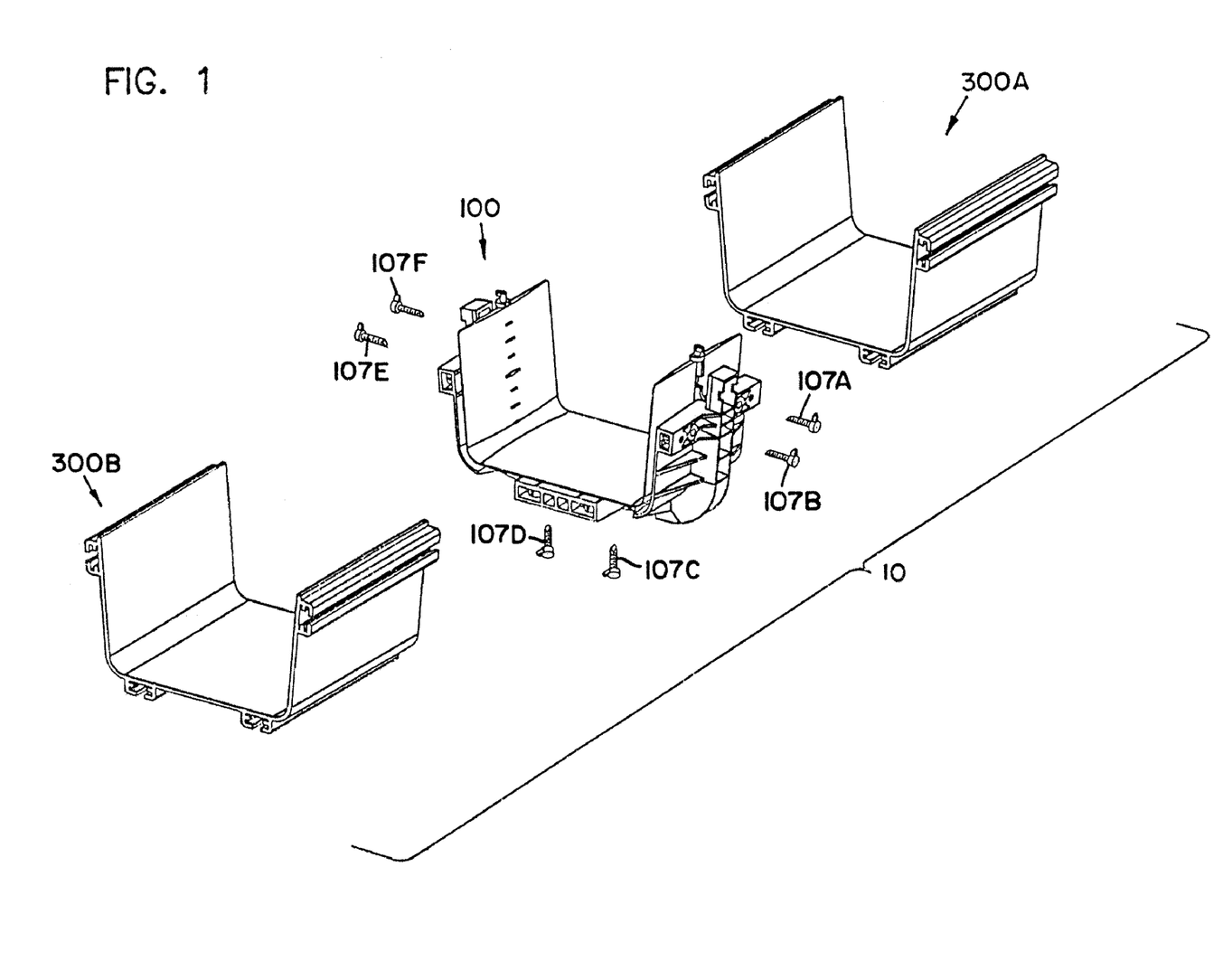
FIG. 1 is a perspective view of an embodiment of a trough system shown in exploded form.

FIG. 1 shows an example trough system 10 including a coupler 100 for interconnecting trough members 300A, 300B. Coupler 100 includes locking elements 107A, 107B, 107C, 107D, 107E, 107F that secure the connection between coupler 100 and trough members 300A, 300B.

In addition, coupler 100 can be configured to release the connections between coupler 100 and trough members 300A, 300B. In an example embodiment, locking elements 107A, 107B, 107C, 107D, 107E, 107F are tool-less (i.e., do not require the use of a separate tool to couple and uncouple trough members 300A, 300B to coupler 100). However, elements requiring one or more auxiliary tools are also within the scope of the present disclosure.

I. Coupler

Figure 2:
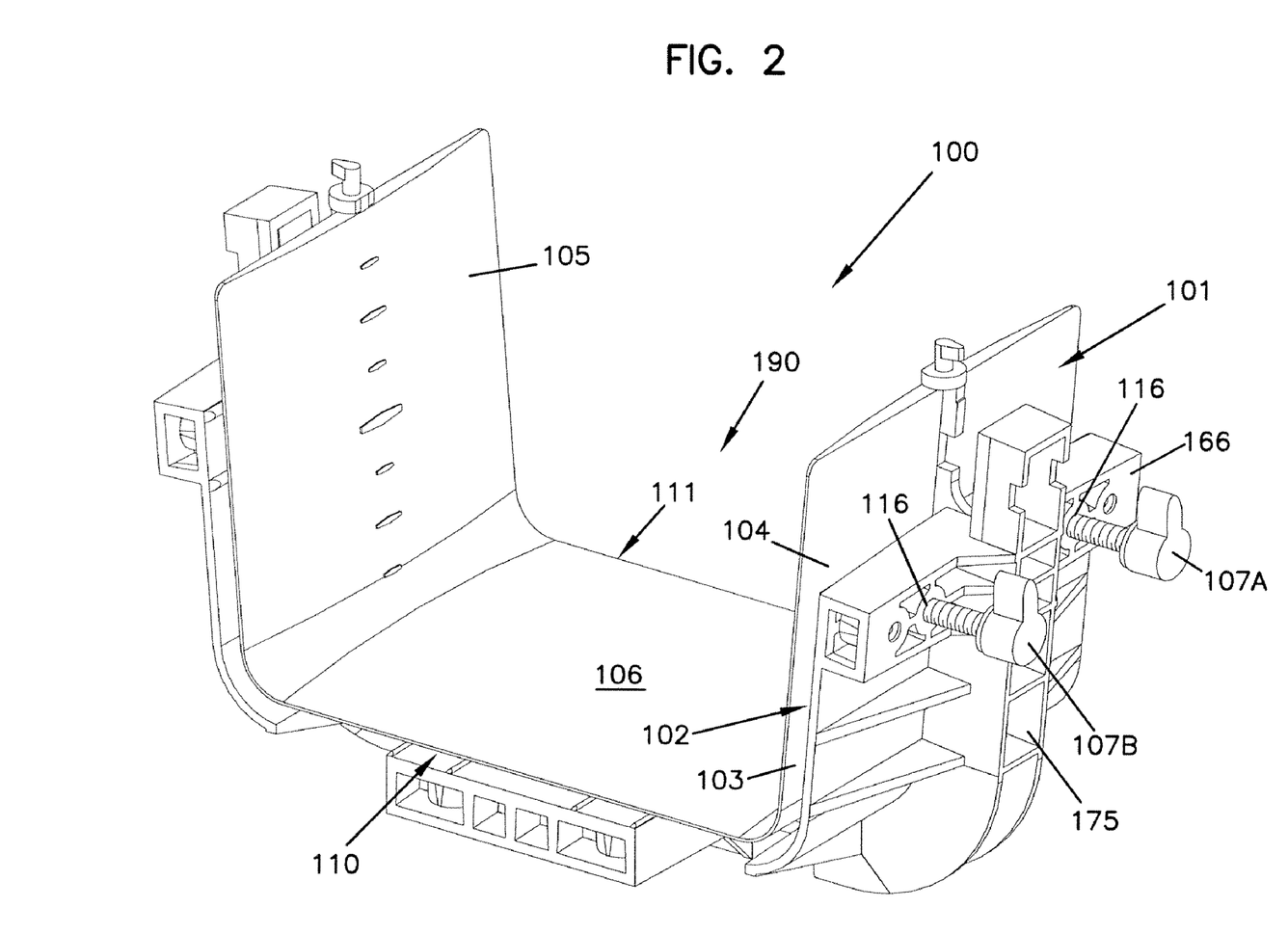
FIG. 2 is a perspective view of an embodiment of a coupler of the trough system of FIG. 1.

As shown in FIG. 2, coupler 100 includes a first guiding surface 101 and a second guiding surface 102 at least partially surrounding first guiding surface 101, as well as a first coupler end 110 and a second coupler end 111. A spacing 103 is defined between first guiding surface 101 and second guiding surface 102. Spacing 103 is sized to receive a trough member (e.g., trough members 300A, 300B) or another trough system component inserted into the spacing 103 in a longitudinal direction 190.

First guiding surface 101 of coupler 100 is generally in the shape of a trough, including a first side wall portion 104 and a second side wall portion 105, as well as a bottom wall portion 106 joining first and second side wall portions 104 and 105. As used herein, the term "trough" means any structure that defines an interior in which an element such as an optical cable can be maintained. Second guiding surface 102 is also in the shape of a trough. A midpoint or midsection 175 divides coupler 100 into first and second halves, and generally surrounds at least a portion of first guiding surface 101. A rib portion 166 is coupled to second guiding surface 102 and includes apertures 116 extending through second guiding surface 102 to spacing 103.

Figure 3:
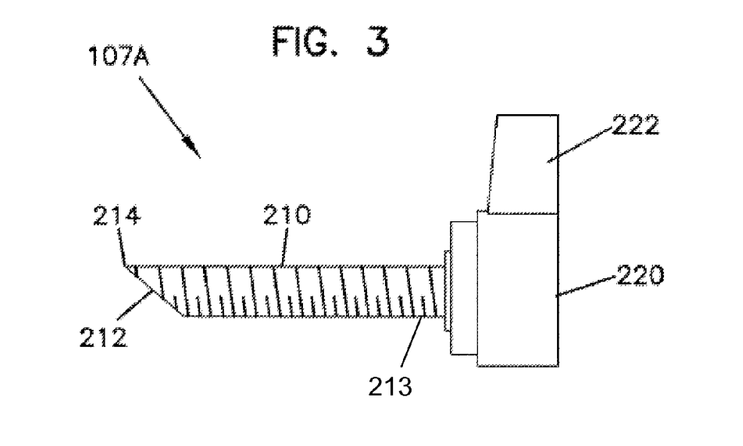
FIG. 3 is a side view of an embodiment of a locking element of the coupler of FIG. 2.
Figure 4:
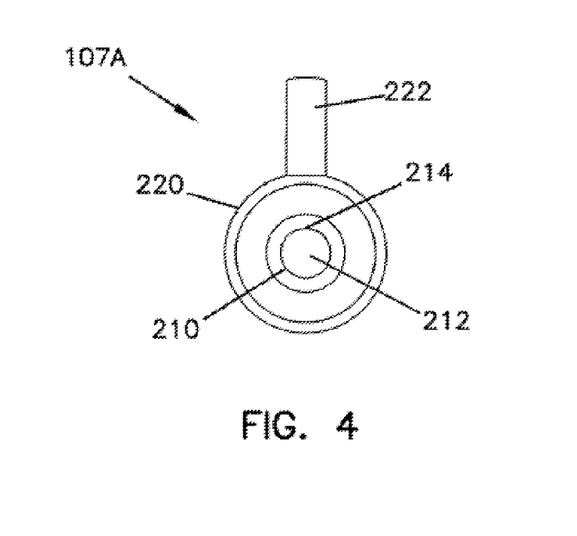
FIG. 4 is an end view of the locking element of FIG. 3.

Referring now to FIGS. 3 and 4, locking element 107A is described in more detail. Locking element 107A includes a threaded portion 210 with first and second ends 212, 213, and a handle portion 220 coupled to the end 213. Threaded portion 210 includes threads that are sized to be threaded into aperture 116 on coupler 100 (see FIG. 2). End 212 of threaded portion 210 extends at an angle to a point 214 that is configured to engage a trough member, as described further below. In example embodiments, end 212 including point 214 forms a beveled edge similar to that of a chisel point.

Handle portion 220 includes a key portion 222 that corresponds to the position of point 214 on end 212 of threaded portion 210. For example, in the illustrated embodiment, key portion 222 is positioned at the same orientation as that of point 214. In an alternative embodiment, key portion 222 can be positioned opposite to that of point 214 (see FIGS. 11-13). As described further below, handle portion 220 and key portion 222 can be configured to allow an individual to turn locking element 107A within aperture 116 of coupler 100 from locked to unlocked positions.

Figure 5:
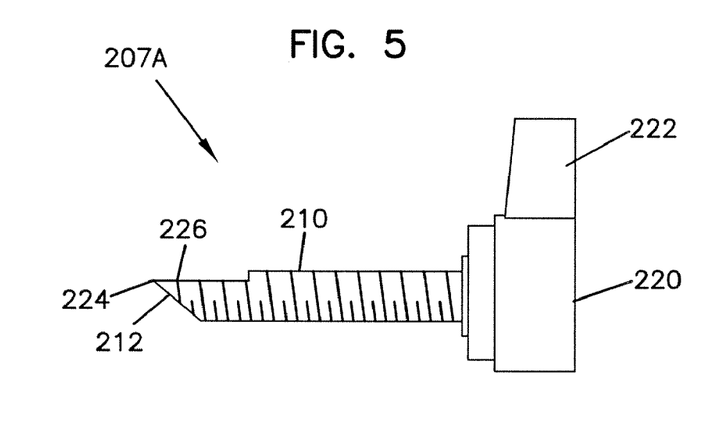
FIG. 5 is a side view of another embodiment of a locking element.
Figure 6:
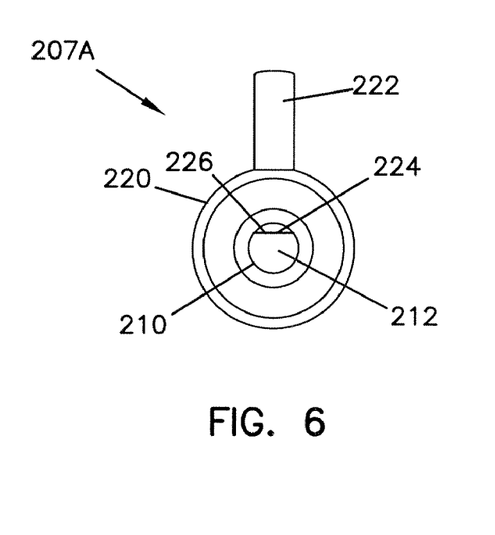
FIG. 6 is an end view of the locking element of FIG. 5.

Referring now to FIGS. 5 and 6, an alternative embodiment of a locking element 207A is shown. Locking element 207A is similar to locking element 107A described above, except that locking element 207A includes a notch 226 formed in end 212 so that point 224 forms a straight (see FIG. 6), rather than curved (see FIG. 4) surface.

Other configurations for locking elements are possible. For example, in other embodiments, handle portion 220 can include two opposite key portions 222 so that locking element 107A is generally in the shape of a "T."

Figure 7:
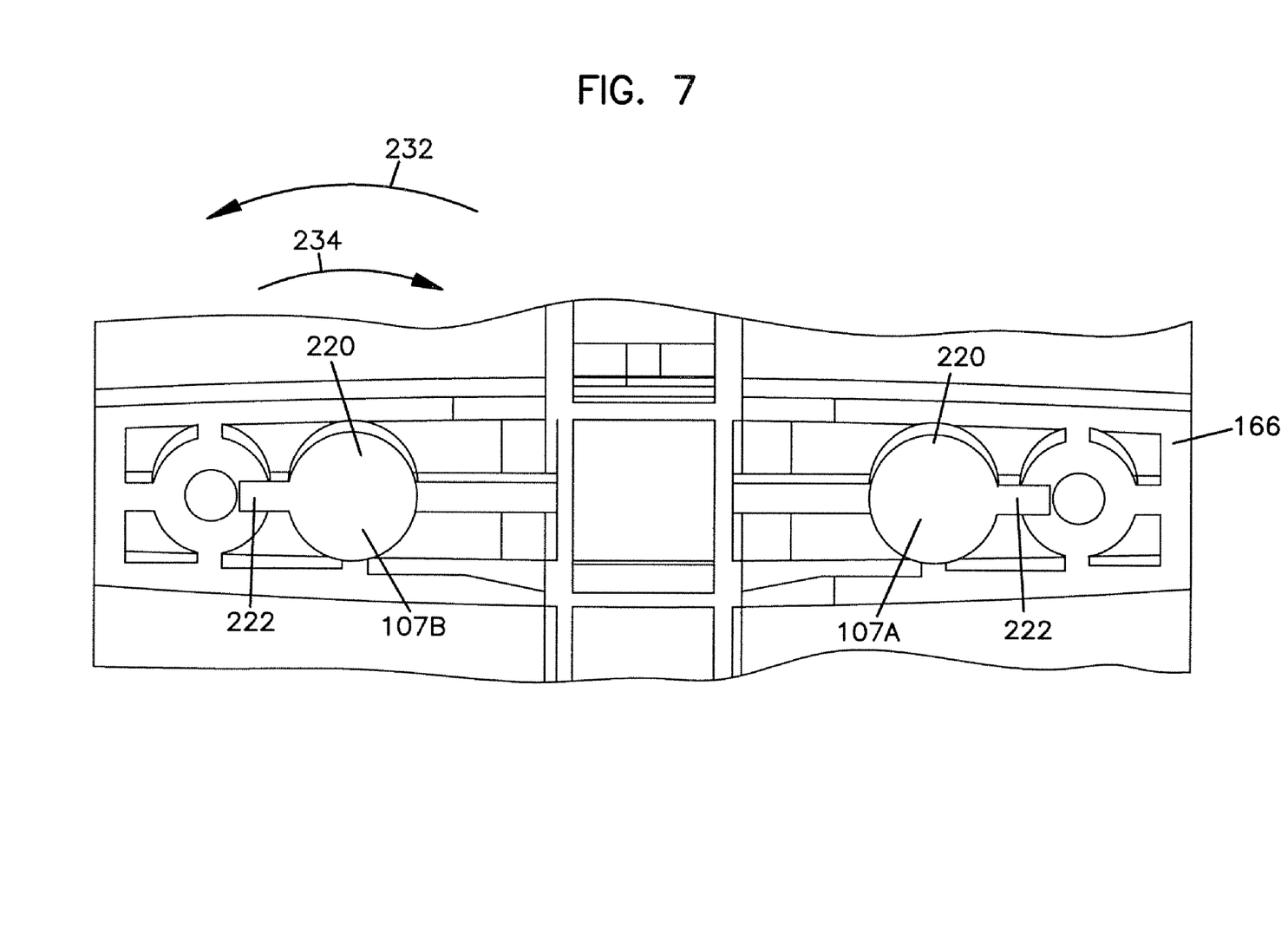
FIG. 7 is a side view of a portion of the coupler of FIG. 2 including locking elements in an unlocked position.
Figure 8:
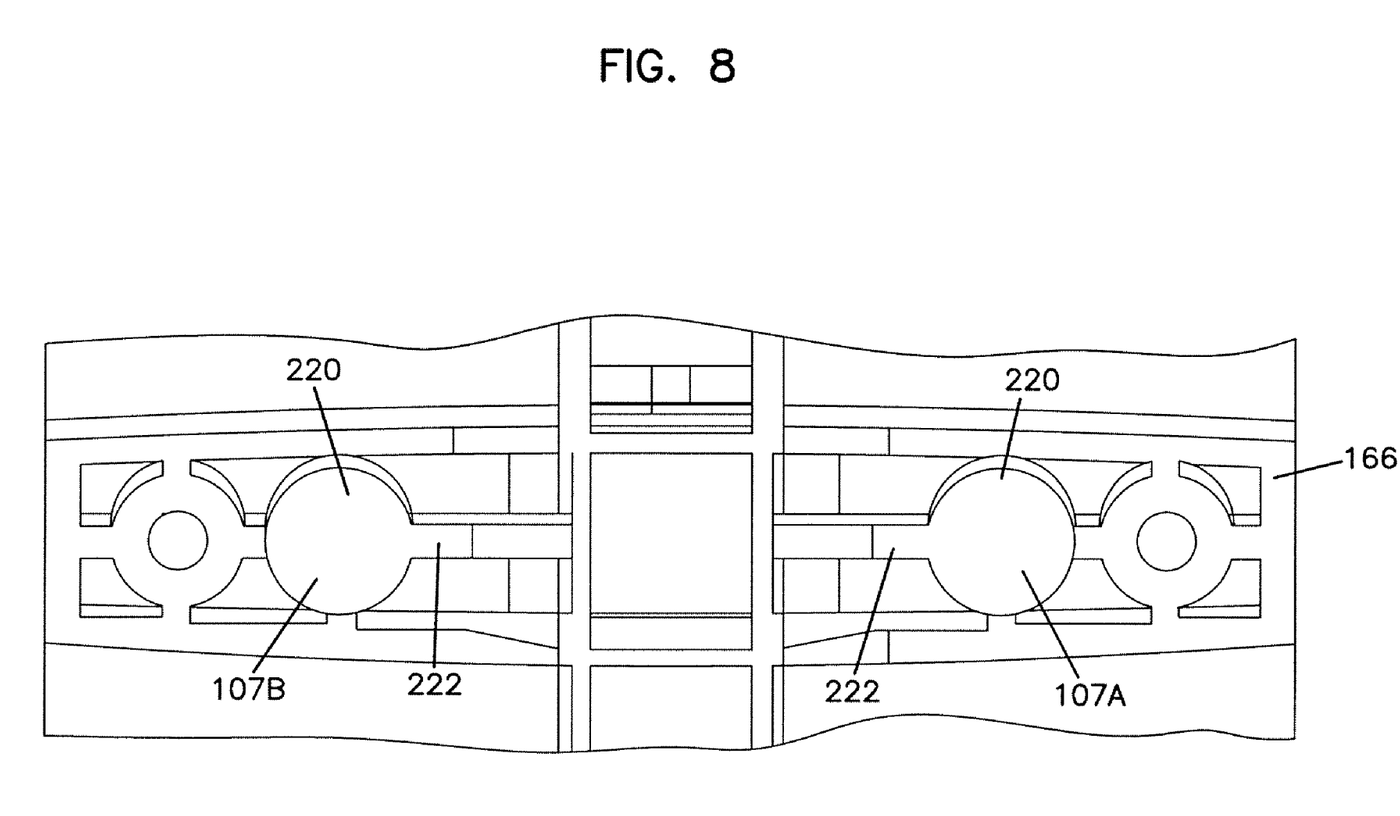
FIG. 8 is another side view of the coupler of FIG. 7 with the locking elements in a locked position.

Referring now to FIGS. 7 and 8, locking elements 107A, 107B are shown threaded into apertures 116 of coupler 100. Locking elements 107A, 107B can be rotated in a direction 234 (clockwise) to thread locking elements 107A, 107B further into apertures 116 to a locked position (FIG. 7), and can be rotated in a direction 232 (counter-clockwise) to unthread locking elements 107A, 107B out of apertures 116 to an unlocked position (FIG. 8). For example, handle portions 220 of locking elements 107A, 107B can be rotated together or individually in directions 232, 234 so that key portions 222 move from the locked position at which key portions 222 extend away from one another (FIG. 7) to the unlocked position at which key portions 222 extend toward on another (FIG. 8). Because key portions 222 correspond to points 214 on ends 212 of threaded portion 210 of locking elements 107A, 107B, key portions 222 provide a visual indication of the position of points 214, as described further below.

In example embodiments, locking elements 107A, 107B can be rotated without the use of tools (i.e., by hand) so that locking elements 107A, 107B can be moved from locked to unlocked positions and vice versa. In alternative embodiments, a tool can be used.

II. Trough

Figure 9:
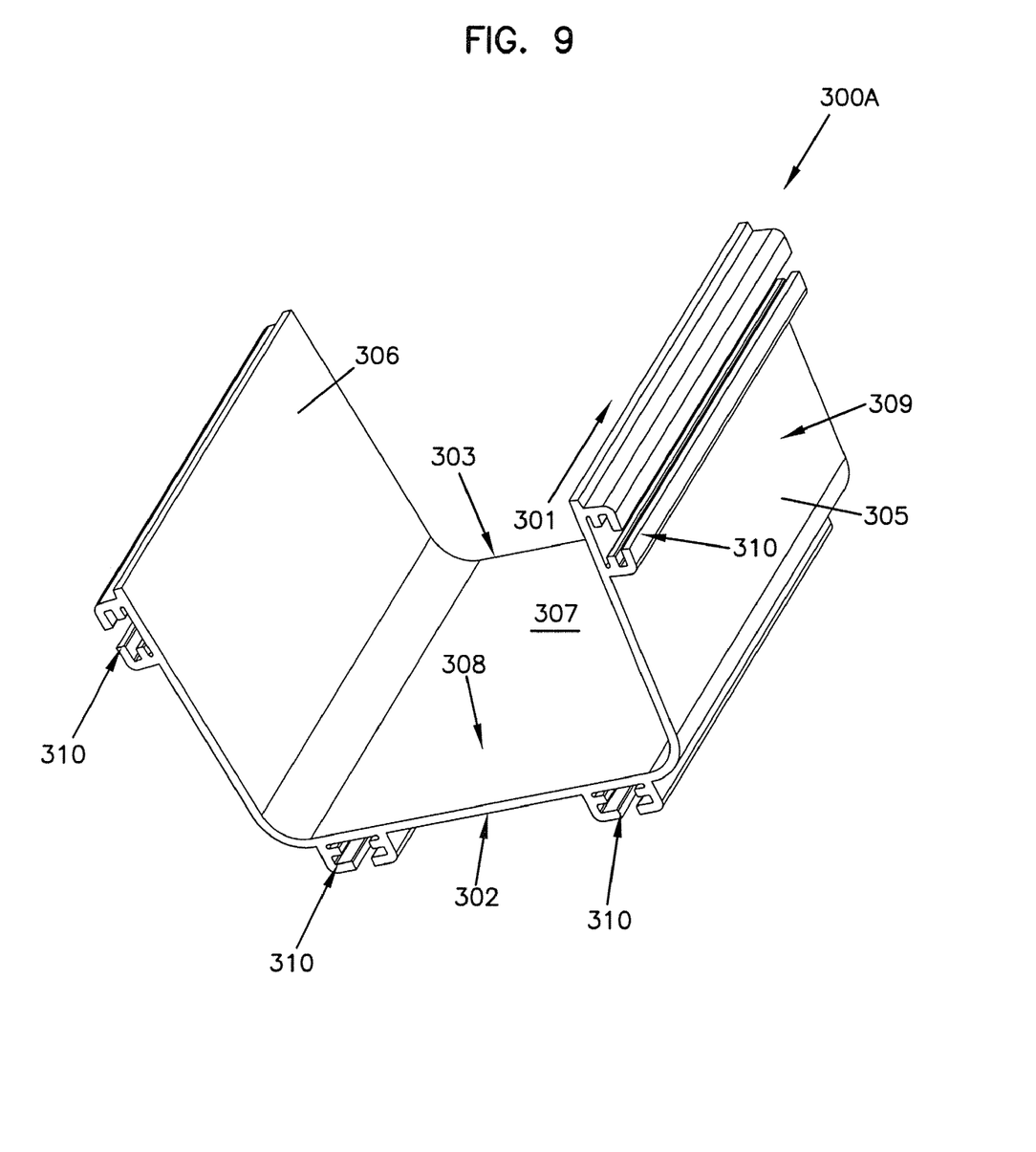
FIG. 9 is a perspective view of an embodiment of a trough member of the trough system of FIG. 1.

Referring now to FIG. 9, trough member 300A is shown in more detail. As used herein, the phrase "trough member" is used to refer to any trough, fitting, railway, raceway, or similarly configured component including any number of ends. Although a specific embodiment of a trough member is shown in and described herein, other trough members can also be used.

Trough member 300A includes a first terminal end 302 and a second terminal end 303. Trough member 300A is generally in the shape of a trough including first and second side walls 305, 306 coupled by a bottom wall 307, thereby defining an interior surface 308 and an exterior surface 309. Walls 305, 306, 307 are each generally planar. In example embodiments, exterior surface 309 of trough member 300A defines one or more slots 310 on the side walls 305 and 306 and bottom wall 307.

III. System

Figure 10:
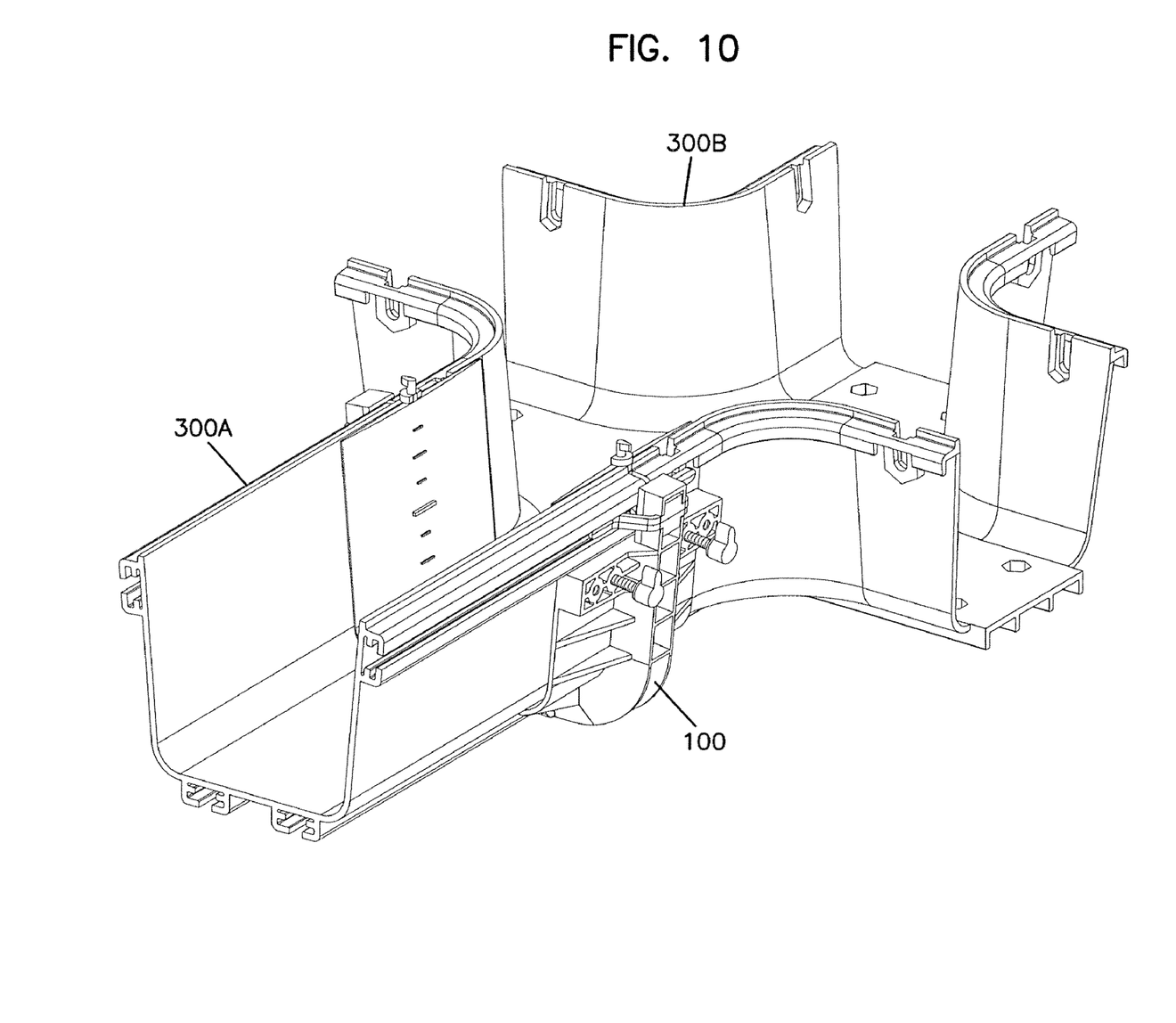
FIG. 10 is a perspective view of another embodiment of a trough system.

Referring now to FIG. 10, terminal ends 302, 303 of the trough members 300A, 300B are slidingly engaged in the spacing 103 between the first and second guiding surfaces 101 and 102 of the coupler 100. The thickness of the walls of each of the trough members 300A, 300B, or the distance between the inner and outer surfaces 308, 309, are sized to fit within the spacing 103 of the coupler 100. The coupler 100 overlaps the terminal ends 302, 303 of each of the trough members 300A, 300B to form the coupling, the overlap defining an overlap region.

Figure 11:
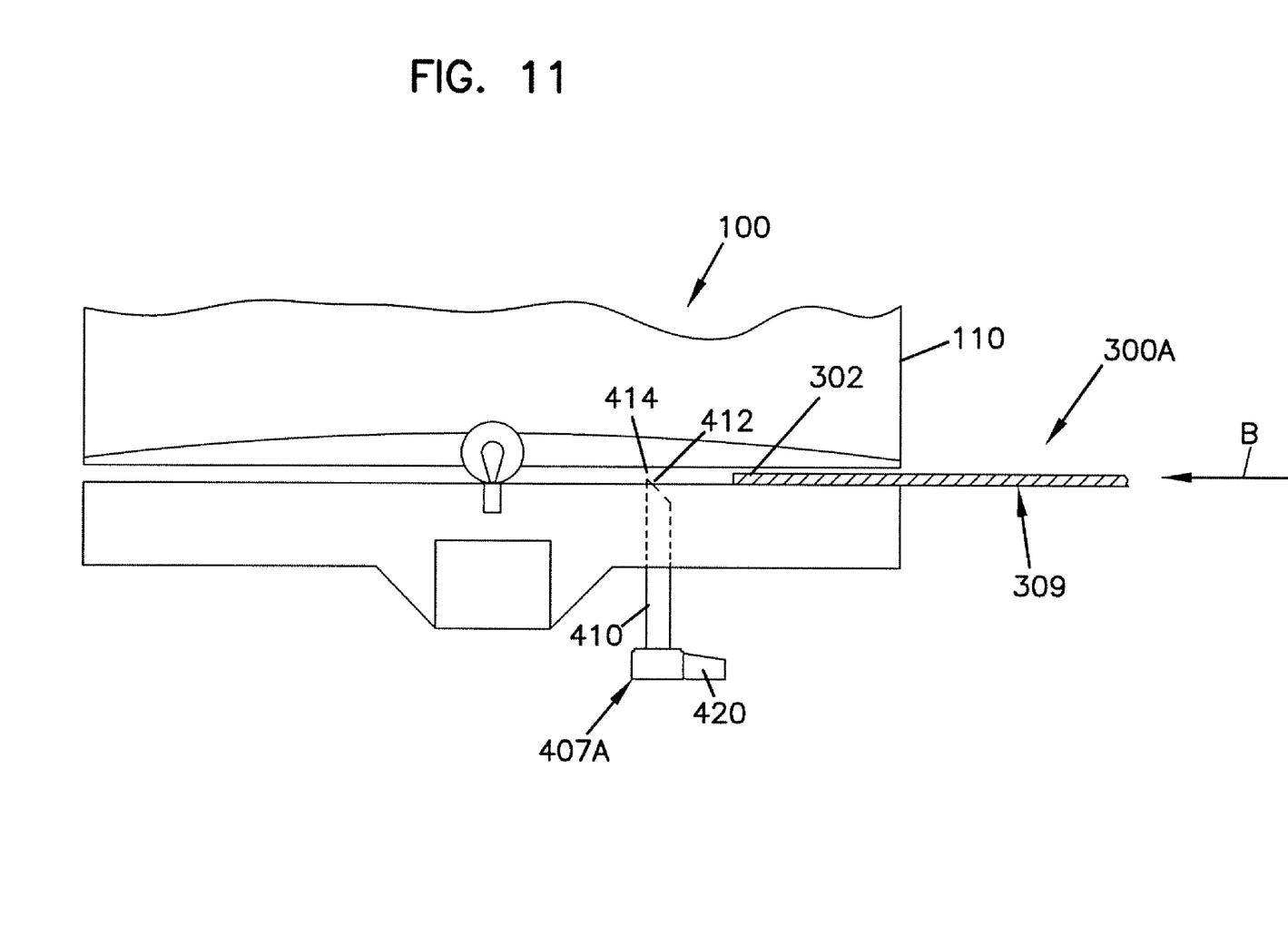
FIG. 11 is a top view of a portion of a coupler with a locking element in a locked position and a trough member in a partially inserted position.

Referring now to FIG. 11, locking element 407A is shown, including a threaded portion 410 with end 412 having point 414, and a head portion 420. In the example shown, head portion 420 also functions as a key positioned opposite to that of point 414 at end 412 of locking element 407A.

As shown in FIG. 11, head portion 420 is positioned to extend towards terminal end 302 of trough member 300A in a locked position. As trough member 300A is inserted into end 110 of coupler 100 in a direction B, terminal end 302 contacts end 412 of locking element 407A, terminal end 320 rides over point 414 and outer surface 309 can ride along point 414 as trough member 300A is inserted into coupler 100. In this position, the contact between point 414 of locking element 407A and outer surface 309 of trough member 300A resists movement of trough member 300A in a direction opposite to that of direction B out of coupler 100.

Figure 12:
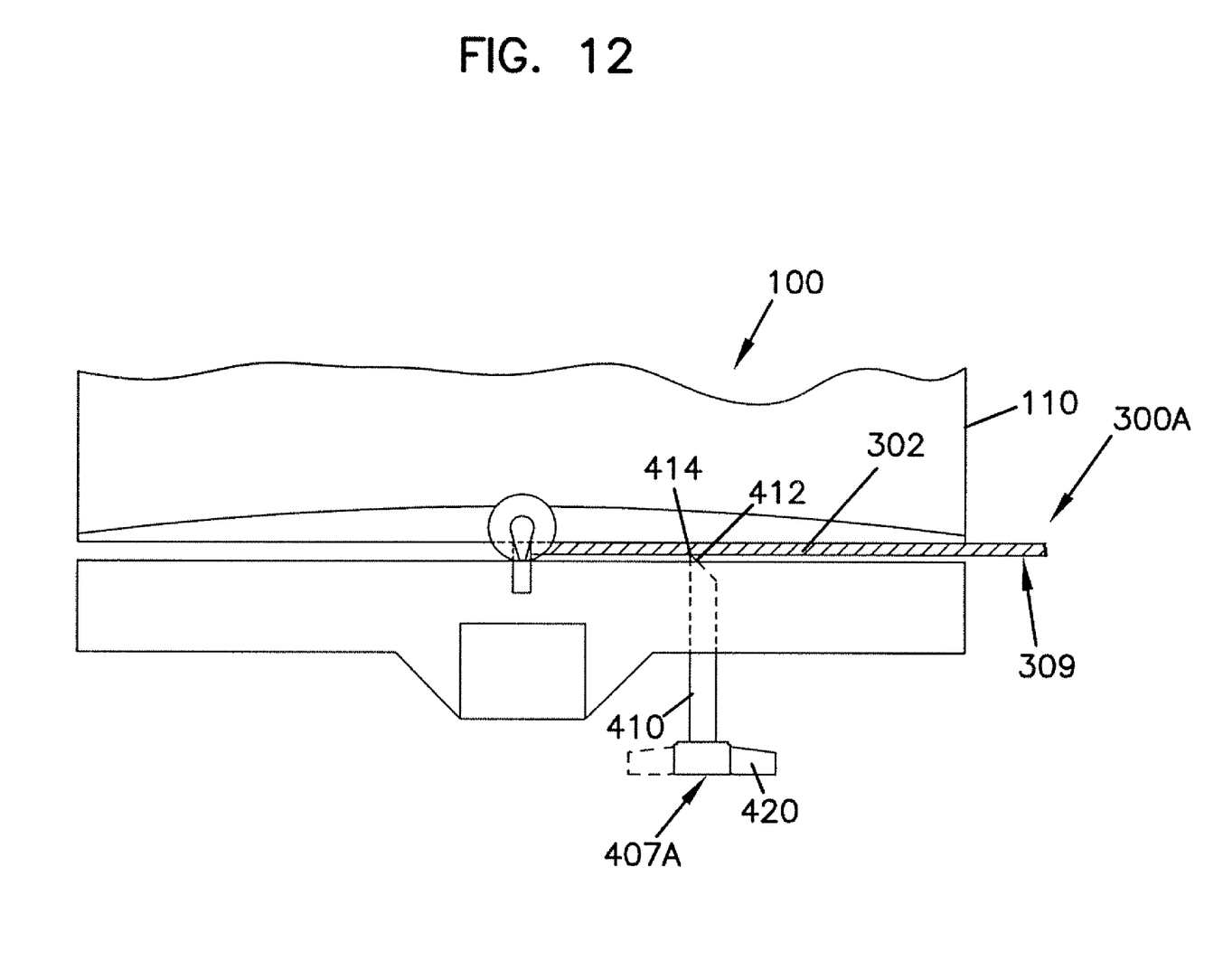
FIG. 12 is another top view of the coupler and the trough member of FIG. 11 in a fully inserted position.
Figure 13:
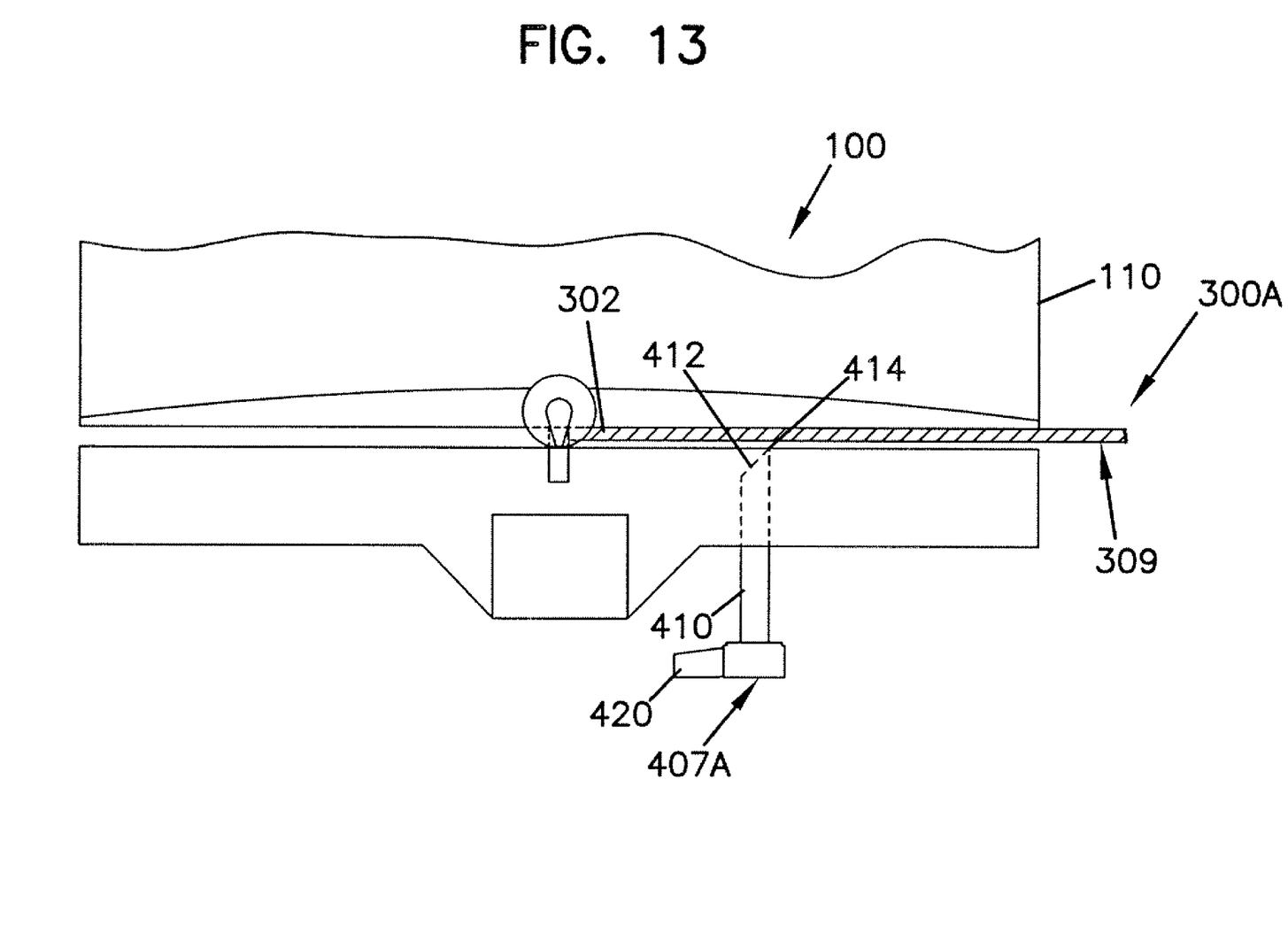
FIG. 13 is another top view of the coupler and the trough member of FIG. 12 with the locking element in an unlocked position.

As shown in FIGS. 12 and 13, to release trough member 300A, head portion 420 of locking element 407A is rotated in a counterclockwise direction to move locking point 414 of element 407A transversely away from trough member 300A so that point 414 releases outer surface 309 of trough member 300A and assumes an unlocked position as shown in FIG. 13. In this position, terminal end 302 of trough member 300A can be removed from coupler 100.

Trough member 300B can be coupled to the opposite end of coupler 100 in a similar manner. In example embodiments, each locking element on opposite sides of coupler 100 can be moved separately to separately release trough members 300A, 300B. Alternatively, both locking elements can be moved at the same time to release both trough members 300A, 300B at the same time.

In some embodiments, indicators are provided on rib portion 166 of coupler 100 to correspond to key portion 222 of locking element 107A. For example, in one embodiment, a first indicator on rib portion 166 is labeled "unlocked" and a second indicator is labeled "locked" to assist the user in determining the optimal position for key portion 222 for the locked and unlocked positions.

In addition, in some embodiments, threaded portion 210 includes an indicator that assists the user in determining the optimal transverse position of locking element 107A with respect second guiding surface 102 to coupler 100 for locked and unlocked positions. For example, in one embodiment, threaded portion 210 includes a first indicator labeled "unlocked" and a second indicator is labeled "locked" to assist the user in determining the optimal transverse position for threaded portion 210 for the locked and unlocked positions.

The other locking elements 107B, 107C, 107D, 107E, and 107F function in a manner similar to that of locking element 107A.

IV. Method of Use

An example method for coupling one or both of trough members 300A, 300B to coupler 100 is as follows. Locking element 407A is positioned in the locked position so that, as terminal end 302 is inserted into coupler 100, outer surface 309 rides along point 414. See, for example, FIG. 11. When trough member 300A is fully inserted into coupler 100, point 414 engages outer surface 309 of trough member 300A to resist movement of trough member 300A out of coupler 100. Trough member 300B can be coupled to second coupler end 111 of coupler 100 in a similar manner.

An example method of removing trough member 300A includes rotating locking element 407A in the counterclockwise direction so that locking element 407A moves transversely so that point 414 moves away from outer surface 309 of trough member 300A to the unlocked position. Once point 414 disengages outer surface 309, trough member 300A can be removed from spacing 103 of coupler 100. Trough member 300B can be removed in a similar fashion.

In example embodiments, the locking elements disclosed herein are tool-less in that the locking elements do not require a separate tool to move the locking elements from the locked position to the unlocked position and vice versa. For example, in some embodiments, the locking elements can be moved from the locked position to the unlocked position through use of the user's hand.

In example embodiments, the locking elements disclosed herein are auto-locking, in that the locking elements can be placed in the locked position prior to insertion of the trough member into the coupler. When the trough member is introduced into the coupler, the locking elements automatically lock the trough member to the coupler. The locking elements can subsequently be moved to the unlocked position to release the trough member from the coupler.

Alternative embodiments to those provided herein are also possible. For example, in one alternative embodiment, a coupler can be configured to be coupled to more than two trough members, therefore including more than the first and second coupler ends. Further, a greater number of locking elements can be presented for each coupler end, or, alternatively, fewer locking elements such as, for example, two on opposing sides, can be used.

The above specification, examples and data provide a complete description of the manufacture and of the invention. Since many embodiments of the invention can be made without departing from the spirit and scope of the disclosure, the invention resides in the claims hereinafter appended.

What is claimed is:

1. A locking element for a coupler of a cable trough system, the locking element comprising:
   a threaded portion including first and second ends, the first end extending at an angle to a point; and
   a head portion coupled to the threaded portion at the second end, the head portion including a key portion that corresponds to the point of the first end of the threaded portion.

2. The locking element of claim 1, wherein the first end of the threaded portion defines a notch adjacent to the point.

3. The locking element of claim 1, wherein the key portion is aligned with the point of the first end of the threaded portion.

4. The locking element of claim 1, wherein the first end forms a beveled edge.

5. A coupler for a cable trough system, the coupler comprising:
   a coupler including a body including a bottom wall and two side walls defining a trough, the body having a body terminal end defining an overlap region, the overlap region being sized to slideably receive a terminal end of a trough member along a longitudinal direction of the body; and
   a locking element including a threaded portion including first and second ends, the first end extending at an angle to a point, and a head portion coupled to the threaded portion at the second end, the head portion including a key portion that corresponds to the point of the first end of the threaded portion, the threaded portion of the locking element being threaded into a first aperture defined by the body of the coupler.

6. The coupler of claim 5, wherein the first end forms a beveled edge.

7. A cable trough system, comprising:
   a first trough member including an exterior surface; and
   a coupler including a body including a bottom wall and two side walls defining a trough, the body having a body terminal end defining an overlap region, the overlap region being sized to slideably receive a terminal end of a first trough member along a longitudinal direction of the body, and the coupler including a first locking element including a threaded portion including first and second ends, the first end extending at an angle to a point, and a head portion coupled to the threaded portion at the second end, the head portion including a key portion that corresponds to the point of the first end of the threaded portion, the threaded portion of the locking element being threaded into a first aperture defined by the body of the coupler;
   wherein, as the first trough member is inserted into the coupler, the point of the first end of the first locking element contacts and rides along the exterior surface of the first trough member, and wherein, when the first trough member is fully inserted into the coupler, the point engages the exterior surface to couple the first trough member to the coupler.

8. The system of claim 7, wherein the first end of the threaded portion of the first locking element defines a notch adjacent to the point.

9. The system claim 7, wherein the key portion of the first locking element is aligned with the point of the first end of the threaded portion.

10. The system of claim 7, further comprising a second locking element including a threaded portion having a first end with a point, and a second end coupled to a handle portion, the second locking element being threaded into a second aperture defined by the body of the coupler, wherein the point of the second locking element engages a second trough member inserted into the coupler.

11. A method for coupling a coupler to a trough member, the method comprising:
   threading a locking element into an aperture defined by the coupler to a locked position, the locking element including a threaded portion including first and second ends, the first end extending at an angle to a point, and a head portion coupled to the threaded portion at the second end, the head portion including a key portion that corresponds to the point of the first end of the threaded portion;
   sliding the trough member into the coupler so that the an exterior surface of the trough member rides along the point of the locking element until the trough member is fully inserted into the coupler; and allowing the point of the locking element to engage the exterior surface of the trough member to resist movement of the trough member out of the coupler.

12. The method of claim 11, further comprising:
rotating the key portion to an unlocked position; and
sliding the trough member out of the coupler.

\* \* \* \* \*